United States Patent
Barzik et al.

(10) Patent No.: US 10,929,018 B2
(45) Date of Patent: *Feb. 23, 2021

(54) LAYERED CLUSTERED SCALE-OUT STORAGE SYSTEM

(71) Applicant: INTERNATIONAL BUSINESS MACHINES CORPORATION, Armonk, NY (US)

(72) Inventors: Zah Barzik, Bishon LeZion (IL); Dan Ben-Yaacov, Tel Aviv (IL); Mor Griv, Ramat Hasharon (IL); Maxim Kalaev, Petach Tikva (IL); Rivka M. Matosevich, Zichron-Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,794

(22) Filed: Sep. 20, 2019

(65) Prior Publication Data
US 2020/0019316 A1 Jan. 16, 2020

Related U.S. Application Data

(63) Continuation of application No. 15/461,556, filed on Mar. 17, 2017.

(51) Int. Cl.
*G06F 12/00* (2006.01)
*G06F 3/06* (2006.01)

(52) U.S. Cl.
CPC ............ *G06F 3/0604* (2013.01); *G06F 3/067* (2013.01); *G06F 3/0635* (2013.01); *G06F 3/0658* (2013.01)

(58) Field of Classification Search
CPC .... G06F 3/0604; G06F 3/0635; G06F 3/0658; G06F 3/067
See application file for complete search history.

(56) References Cited

U.S. PATENT DOCUMENTS

| | | |
|---|---|---|
| 7,340,639 B1 | 3/2008 | Lee et al. |
| 7,443,872 B1 | 10/2008 | Corbett et al. |
| 8,612,481 B2 | 12/2013 | Grier et al. |
| 8,892,789 B2 | 11/2014 | Spry |
| 9,448,901 B1 * | 9/2016 | Aslam ................. G06F 11/2097 |

(Continued)

OTHER PUBLICATIONS

List of IBM Patents or Patent Applications Treated as Related, filed herewith.

*Primary Examiner* — Prasith Thammavong
(74) *Attorney, Agent, or Firm* — ZIP Group PLLC

(57) ABSTRACT

A mega cluster storage system includes clusters of multiple storage modules. Each module is able to access a portion of the data within the mega cluster and serves as a proxy in order for another storage module to access the remaining portion of the data. A cluster is assigned to a unique cluster volume and all the data within the cluster volume is accessible by all of the modules within the cluster. Each host connection to the mega cluster is associated with a particular cluster volume. A module that receives a host I/O request determines whether the I/O request should be satisfied by a module within its own cluster or be satisfied by a module within a different cluster. The module may forward the I/O request to a module within a different cluster as indicated by a distribution data structure that is allocated and stored within each storage module.

20 Claims, 9 Drawing Sheets

(56) References Cited

U.S. PATENT DOCUMENTS

| | | |
|---|---|---|
| 9,648,102 B1 | 5/2017 | Davis et al. |
| 2002/0184330 A1 | 12/2002 | Wilson et al. |
| 2003/0005236 A1* | 1/2003 | Arimilli .............. G06F 12/0831 |
| | | 711/146 |
| 2004/0225793 A1* | 11/2004 | Hunter ................ G06F 13/4045 |
| | | 710/300 |
| 2007/0156972 A1 | 7/2007 | Uehara et al. |
| 2007/0233700 A1 | 10/2007 | Tomonaga |
| 2008/0071939 A1 | 3/2008 | Tanaka et al. |
| 2009/0113138 A1 | 4/2009 | Bass et al. |
| 2009/0193198 A1* | 7/2009 | Papazova ............ G06F 12/0831 |
| | | 711/141 |
| 2011/0125974 A1* | 5/2011 | Anderson ......... G06F 15/17331 |
| | | 711/153 |
| 2011/0185128 A1* | 7/2011 | Ukai ................... G06F 12/0817 |
| | | 711/146 |
| 2012/0005439 A1 | 1/2012 | Ukai |
| 2014/0006720 A1 | 1/2014 | Hosokawa et al. |
| 2014/0089572 A1 | 3/2014 | Koka et al. |
| 2014/0297957 A1 | 10/2014 | Aoyagi et al. |
| 2015/0067269 A1 | 3/2015 | Wang et al. |
| 2015/0113230 A1 | 4/2015 | Cheng |
| 2016/0188474 A1 | 6/2016 | Wang et al. |
| 2016/0224603 A1 | 8/2016 | Yang et al. |
| 2017/0168939 A1 | 6/2017 | Jalal et al. |
| 2017/0242796 A1* | 8/2017 | Gschwind ................ G06F 9/50 |
| 2017/0315916 A1 | 11/2017 | Cheng et al. |
| 2017/0371787 A1 | 12/2017 | Kalyanasundharam et al. |
| 2018/0089098 A1 | 3/2018 | Guim Bernat et al. |
| 2018/0095906 A1 | 4/2018 | Doshi et al. |

\* cited by examiner

400

450 452 454 456 458 460

| Block Addr | VOL ID | Cluster ID | Module ID | SSV ID | Phy Addr |
|---|---|---|---|---|---|
| aaa | 320 | 300A | 200D | 321 | zzz |
| aab | 320 | 300A | 200D | 321 | zzy |
| aac | 320 | 300A | 200E | 322 | zzz |
| aad | 320 | 300A | 200E | 322 | zzy |
| aae | 320 | 300A | 200F | 323 | zzz |
| aaf | 320 | 300A | 200F | 323 | zzy |
| aag | 320 | 300A | 200F | 323 | zzx |
| aah | 320 | 300A | 200G | 324 | zzz |
| baa | 330 | 300B | 200H | 331 | zzz |
| bab | 330 | 300B | 200I | 332 | zzz |
| bac | 330 | 300B | 200I | 332 | zzy |
| bad | 330 | 300B | 200I | 332 | zzx |
| bae | 330 | 300B | 200J | 333 | zzz |
| baf | 330 | 300B | 200K | 334 | zzz |
| bag | 330 | 300B | 200K | 334 | zzy |
| bah | 330 | 300B | 200K | 334 | zzx |

FIG. 4

LAYERED CLUSTERED SCALE-OUT STORAGE SYSTEM

FIELD OF THE INVENTION

Embodiments of the invention generally relate to computer systems and more particularly to a storage system that includes clusters of layered scale-out storage modules.

DESCRIPTION OF THE RELATED ART

A scale-out storage system is a storage system that uses a scaling methodology to create a dynamic storage environment that will support data growth on an as-needed basis. Scale-out storage architecture uses a number of storage modules that are configured to create a storage pool. In utilizing scale-out storage, storage modules are added as additional storage resources are required. As the number of storage modules are added, scale-out storage systems are increasing difficult to manage.

Scale-out storage system management schemes exist and typically utilize a flat topology, layered topology, and/or require a host-side counterpart. Flat topologies in large scale-out systems are typically inherently complex and may, therefore, have reduced maintainability. Reduced performance may be experienced with layered topologies due to a host not knowing the internal hierarchical structure of the scale-out storage system. The unknown hierarchical structure of the scale-out storage system may result in excessive hops from one storage module to next in order to satisfy a host's input output (I/O) request. Though hopping negatively impacts overall performance, it may be reduced with an added host side application, such as a driver or module, so that the host could send the I/O request to the optimal module. However, host side applications may merely transfer management complexities from the scale-out storage system to the host and may therefore decrease overall performance. Furthermore, host side applications may also induce additional costs or may not be available, depending on the host operating system and the security policy of the entity that controls the host.

SUMMARY

In an embodiment of the present invention, a layered clustered scale-out storage system is presented. The system includes a first cluster comprising a plurality of storage modules and a second cluster comprising a plurality of storage modules. The first cluster includes a first storage module that has a processor that is configured to receive an I/O read request and a logical address associated with requested data of the I/O read request from a requesting host computer, determine that the requested data is not located within any of a plurality of storage modules also within the first cluster, and determine that the requested data is located within the second cluster. The second cluster includes a second storage module that has a processor that is configured to receive the I/O read request from the processor of the first storage module and determine that the requested data is stored within a third storage module also within the second cluster. The second cluster also includes a third storage module that has a processor that is configured to receive the I/O read request from the processor of the second storage module, access the requested data; and return the requested data to the requesting host computer.

In an embodiment of the present invention, a layered clustered scale-out storage system is presented. The system includes a first cluster comprising a plurality of storage modules and a second cluster comprising a plurality of storage modules. The first cluster includes a first storage module that has a processor that is configured to receive an I/O read request and a logical address associated with requested data of the I/O read request from a requesting host computer, determine that the requested data is not located within any of a plurality of storage modules also within the first cluster, and determine that the requested data is located within the second cluster. The second cluster includes a second storage module that has a processor that is configured to receive the I/O read request from the processor of the first storage module, determine that the requested data is stored within a third storage module also within the second cluster, directly access the requested data within the third storage module bypassing a processor and operating system of the third storage module, and return the requested data to the requesting host computer.

In another embodiment of the present invention, a computer program product for satisfying an input output (I/O) read request with a layered clustered scale-out storage system is presented. The computer program product includes computer readable storage mediums having program instructions embodied therewith. The program instructions are readable to cause a processor of a first storage module to receive an I/O read request and a logical address associated with requested data of the I/O read request from a requesting host computer. The program instructions are readable to cause the processor of the first storage module to determine that the requested data is not located within any of a plurality of storage modules within a same first cluster as that of the first storage module. The program instructions are readable to cause the processor of the first storage module to determine that the requested data is located within a second cluster that comprises a plurality of storage modules. The program instructions are readable to cause the processor of the first storage module to forward the I/O read request to a second storage module that is comprised within the second cluster. The program instructions are readable to cause the processor of the second storage module to determine that the requested data is stored within a third storage module that is comprised the second cluster. The program instructions are readable to cause the processor of the second storage module to directly access the requested data within the third storage module bypassing a processor and operating system of the third storage module. The program instructions are readable to cause the processor of the second storage module to return the requested data to the requesting host computer.

These and other embodiments, features, aspects, and advantages will become better understood with reference to the following description, appended claims, and accompanying drawings.

BRIEF DESCRIPTION OF THE DRAWINGS

FIG. 4 illustrates an exemplary distribution data structure that identifies which data is accessible by each storage module within a mega cluster.

DETAILED DESCRIPTION

A mega cluster scale-out storage system includes multiple clusters of multiple storage modules. Each module is able to access a portion of the data within the mega cluster and serves as a proxy to access the remaining portion of the data within the mega cluster. A cluster is assigned to a unique volume and all the data within this volume is accessible by all of the nodes within the cluster. Each host connection to the mega cluster is associated with a particular volume. A module within the mega cluster that receives a host I/O request determines whether the I/O request should be satisfied by a module within its own cluster or be satisfied by a module within a different cluster by matching the volume associated with the host to the assigned cluster volume. The module that receives the host I/O request may forward the I/O request to a module within the mega cluster that is associated with a logical address of the I/O request within a distribution data structure that is stored within each module of each cluster within the mega-cluster.

Figure 1:
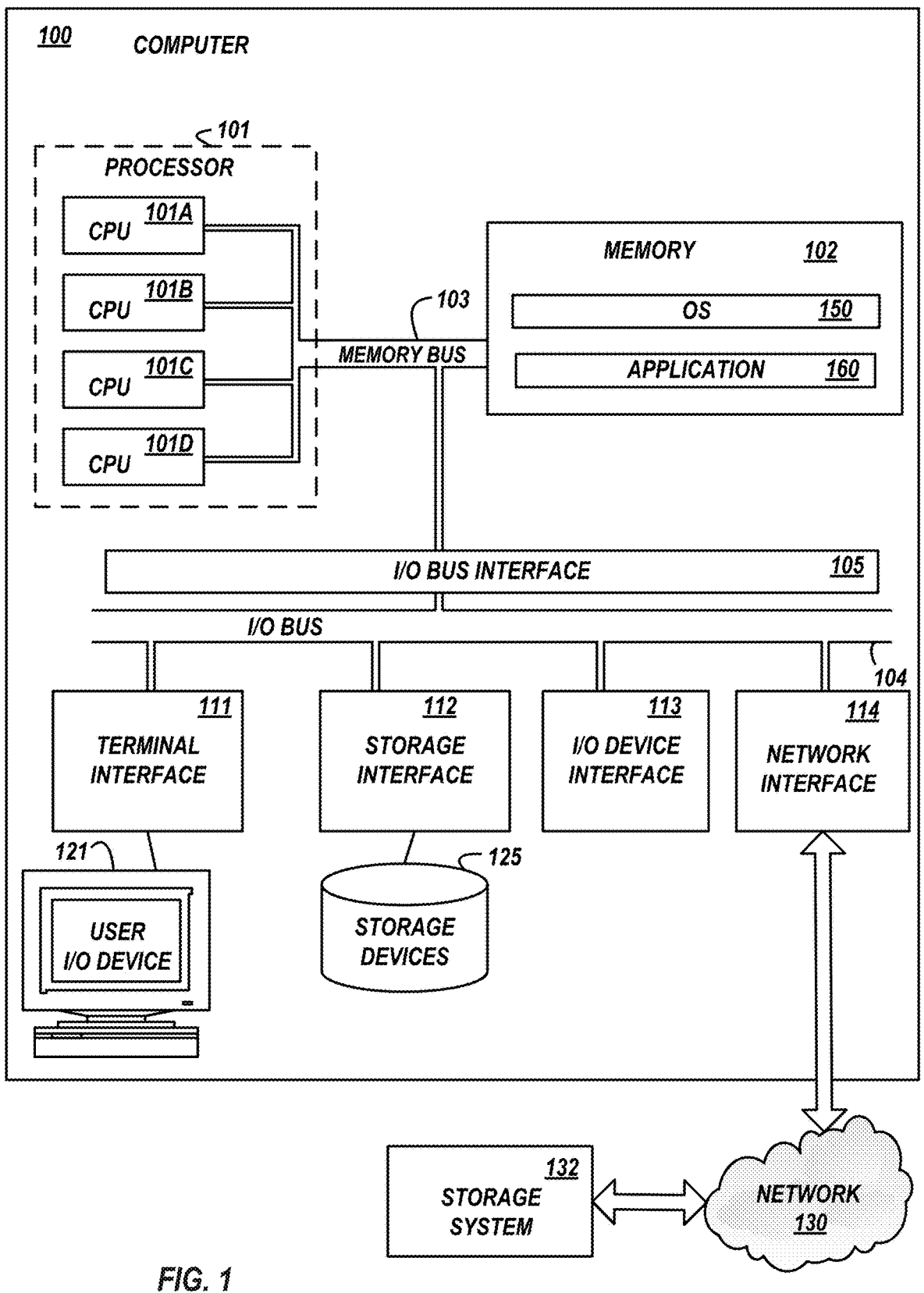
FIG. 1 illustrates a high-level block diagram of an exemplary host system, according to various embodiments of the invention.

Referring to the Drawings, wherein like numbers denote like parts throughout the several views, FIG. 1 depicts a high-level block diagram representation of an exemplary host, which is herein referred to as computer 100 connected to a storage system 132 via a network 130. The term "computer" is used herein for convenience only, and in various embodiments, is a more general data handling device. The mechanisms and apparatus of embodiments of the present invention apply equally to any appropriate data handling device.

Computer 100 may include one or more processors 101, a main memory 102, a terminal interface 111, a storage interface 112, an I/O (Input/Output) device interface 113, and/or a network interface 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150 and one or more applications 160. Although the operating system 150, application 160, etc. are illustrated as being contained within the memory 102 in the computer 100, in other embodiments some or all of them may be on different computer systems and may be accessed remotely, e.g., via a network. The computer 100 may use virtual addressing mechanisms that allow the programs of the computer 100 to behave as if they only have access to a large, single storage entity instead of access to multiple, smaller storage entities.

Thus, while operating system 150 and application 160 are illustrated as being contained within the main memory 102, these elements are not necessarily all completely contained in the same memory at the same time. Further, although operating system 150 and application 160 are illustrated as being separate entities, in other embodiments some of them, portions of some of them, or all of them may be packaged together.

In an embodiment, operating system 150 and application 160 comprise program instructions or statements that are called and executed by the processor 101 or instructions or statements that are interpreted by instructions or statements that execute on the processor 101, to carry out the functions as further described below with reference to FIGs.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage devices and/or other I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more storage devices 125. In an embodiment, the storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the storage device 125, as needed. The local storage devices 125 have a slower access time than does the memory 102, meaning that the time needed to read and/or write data from/to the memory 102 is less than the time needed to read and/or write data from/to for the local storage devices 125.

The I/O device interface unit 113 provides an interface to any of various other input/output devices or devices of other types, such as printers or fax machines. The network interface unit 114 provides one or more communications paths from the computer 100 to other data handling devices, such as storage system 132; such paths may comprise, e.g., one or more networks 130. Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface unit(s) may contain electronic components and logic to adapt or convert data of one protocol on I/O bus 104 to another protocol on another bus. Therefore, network interface 114 may connect a wide variety of devices to computer 100 and to each other such as, but not limited to, tape drives, optical drives, printers, disk controllers, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into the same device.

In various embodiments, the computer 100 is a multi-user mainframe computer system, a single-user system, a storage server, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

A communication network may connect the computer 100 to another data handling device and be any suitable communication network or combination of networks and may support any appropriate protocol suitable for communication of data and/or code to/from the computer 100. In various embodiments, the communication network may represent a data handling device or a combination of data handling devices, either connected directly or indirectly to the computer 100. In another embodiment, the communication network may support wireless communications. In another embodiment, the communication network may support hard-wired communications, such as a telephone line or cable. In another embodiment, the communication network may be the Internet and may support IP (Internet Protocol). In another embodiment, the communication network is implemented as a local area network (LAN) or a wide area network (WAN). In another embodiment, the communication network is implemented as a hotspot service provider network. In another embodiment, the communication network is implemented an intranet. In another embodiment, the communication network is implemented as any appropriate cellular data network, cell-based radio network technology, or wireless network. In another embodiment, the communication network is implemented as any suitable network or combination of networks.

Network 130 which connects computer 100 and storage device 132 is a storage network, which is a network which provides computer 100 access (i.e. read and/or write) to data stored within storage system 130. Network 130 is generally any high-performance network whose primary purpose is to enable storage system 132 to provide storage operations to computer 100. Network 130 may be primarily used to enhance storage devices, such as disk arrays, tape libraries, optical jukeboxes, etc., within the storage system 132 to be accessible to computer 100 so that storage devices within storage system 132 appear to the operating system 150 of computer 100 as locally attached devices. In other words, the storage system 132 may appear to the OS 150 as being storage device 125. A benefit of network 130 is that the amount of storage resource within storage system 132 may be treated as a pool of resources that can be centrally managed and allocated on an as-needed basis. Further, network 130 may be highly scalable because additional storage capacity can be added to storage system 132, as required.

Application 160 and/or OS 150 of multiple computers 100 can be connected to the storage system 132, via the network 130. For example, any application 160 and or OS 150 running on each computer 100 can access shared or distinct storage within storage system 132. When computer 100 wants to access a storage device within storage system 132 via the network 130, computer 100 sends out an I/O access request to the storage system 132. Network 130 may further include cabling, host bus adapters (HBAs), and switches. Each switch and storage system 132 on the network 130 may be interconnected and the interconnections generally support bandwidth levels that can adequately handle peak data activities. Network 130 may be a Fibre Channel SAN, iSCSI SAN, or the like.

FIG. 1 is intended to depict representative major components of the computer 100. Individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
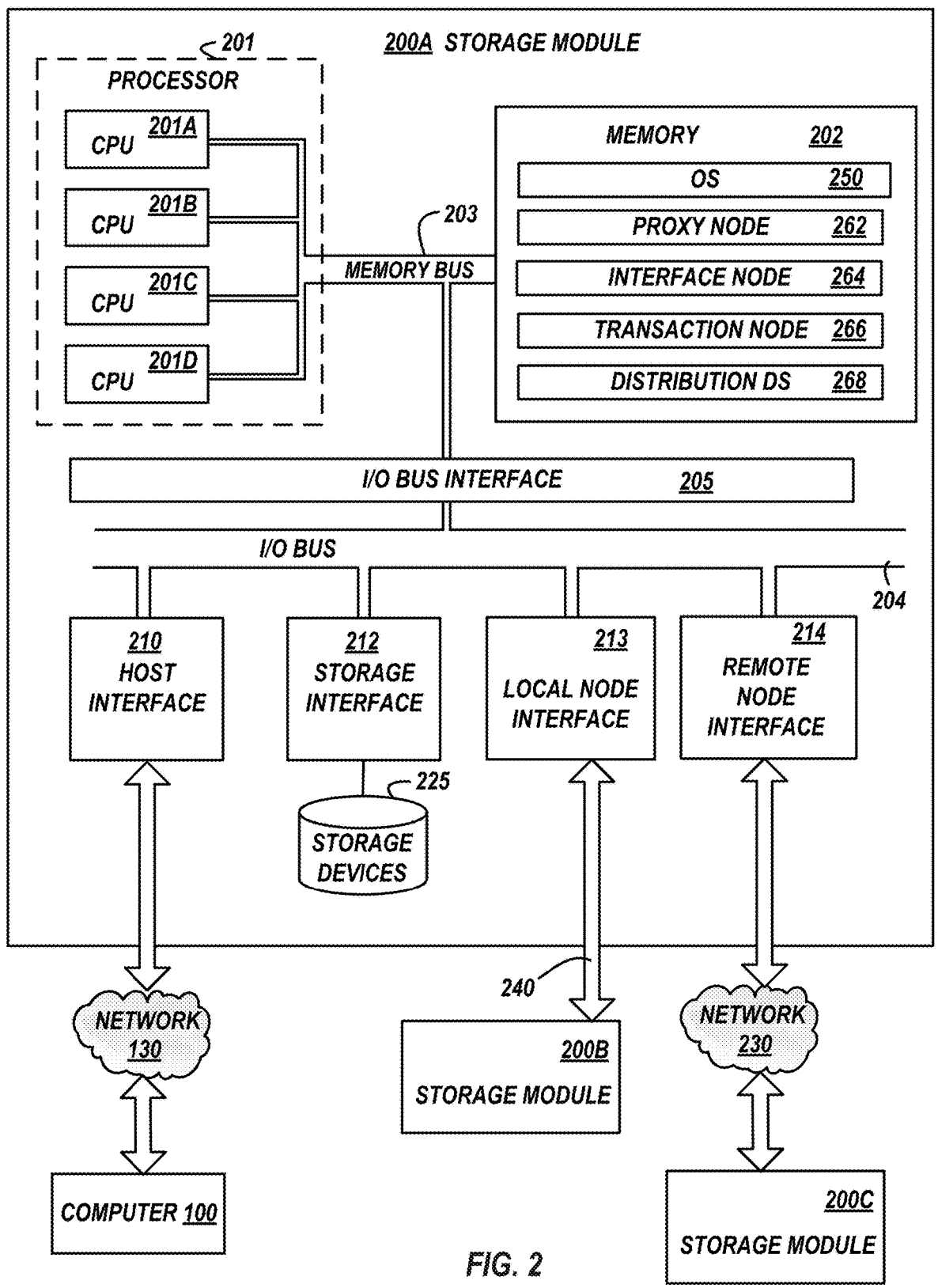
FIG. 2 illustrates a high-level block diagram of an exemplary storage module, according to various embodiments of the invention.

FIG. 2 illustrates a high-level block diagram of an exemplary storage module 200 that is connected to computer 100 via network 130, is connected to another storage module 200B via a peripheral connection 240, and is connected to another storage module 200C via a network 230 connection. The term "storage module" is used herein for convenience only, and in various embodiments, is a more general data handling device. The mechanisms and apparatus of embodiments of the present invention apply equally to any appropriate data handling device.

For clarity, a generic element may be referred herein with an appended numeric identifier and particular instances of the generic element are referred to herein by appending an alpha character to the numeric identifier.

Storage module 200 includes one or more processors 201 and a main memory 202. Storage module 200 also includes a host interface 210, a storage interface 212, a local node interface 213, and/or a remote node interface 214, all of which are communicatively coupled, directly or indirectly, for inter-component communication via a memory bus 203, an I/O bus 204 and an I/O bus interface unit 205. The storage module 200 contains one or more general-purpose programmable central processing units (CPUs) 201A, 201B, 201C, and 201D, herein generically referred to as the processor 201. In an embodiment, the storage module 200 contains multiple processors typical of a relatively large system; however, in another embodiment the storage module 200 may alternatively be a single CPU system. Each processor 201 executes instructions stored in the main memory 202 and may comprise one or more levels of on-board cache.

In an embodiment, the main memory 202 may comprise a random-access semiconductor memory, storage device, or storage medium for storing or encoding data and programs. In another embodiment, the main memory 202 represents the entire virtual memory of the storage module 200, and may also include the virtual memory of other storage modules 200B, 200C, or the like, coupled to the storage module 200. The main memory 202 is conceptually a single monolithic entity, but in other embodiments the main memory 202 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 202 stores or encodes an operating system 250 and one or more applications, such as a proxy manager 262, an interface manager 264, a transaction manager 266, and a distribution data structure manager 268. Although the operating system 150 and one or more applications are illustrated as being contained within the memory 202 in the storage module 200, in other embodiments some or all of them may be on different storage modules and may be accessed remotely, e.g., via network 230 connection, peripheral connection 240, or the like.

The storage module 200 may use virtual addressing mechanisms that allow the programs of the storage module 200 to behave as if they only have access to a large, single storage entity instead of access to multiple, smaller storage entities. Thus, while operating system 250, proxy manager 262, interface manager 264, transaction manager 266, and distribution data structure manager 268 are illustrated as being contained within the main memory 102, these elements are not necessarily all completely contained in the same memory at the same time. Further, although operating system 250 proxy manager 262, interface manager 264, transaction manager 266, and distribution data structure manager 268 are illustrated as being separate entities, in other embodiments some of them, portions of some of them, or all of them may be packaged together.

In an embodiment, operating system 250 and application 260 comprise program instructions or statements that are called and executed by the processor 201 or instructions or statements that are interpreted by instructions or statements that execute on the processor 201, to carry out the functions as further described below with reference to FIGs.

The memory bus 203 provides a data communication path for transferring data among the processor 201, the main memory 202, and the I/O bus interface unit 205. The I/O bus interface unit 205 is further coupled to the system I/O bus 204 for transferring data to and from the various I/O units. The I/O bus interface unit 205 communicates with multiple interface units 210, 212, 213, and 214, through the system I/O bus 204. The I/O interface units support data handing and communication with a variety of storage devices 225 and other modules 200B, 200C, or the like.

The host interface unit 210 supports the communication between storage module 200 and computer 100. For example, when computer 100 writes data to storage module 200, the computer 100 sends a write I/O request to storage system 132 which is received by storage module 200. The write I/O request includes data to-be written and a logical address associated with the data to-be written and is received within storage system 132 by host interface unit 210 of storage module 200.

The storage interface unit 212 supports the attachment of one or more storage devices 225. In an embodiment, the storage devices 225 are rotating magnetic disk drive storage devices, but in other embodiments they are arrays of disk drives configured to appear as a single large storage device to a host computer, or any other type of storage device, such as a flash drive, tape drive, or the like. The contents of the main memory 202, or any portion thereof, may be stored to and retrieved from the storage device 225, as needed.

The local node interface unit 213 provides an interface to one or more other storage modules (e.g. storage module 200B) that are connected to storage module 200 by peripheral connection 240. Peripheral connection 240 is generally a wired, cabled, local, or the like, communication connection between multiple storage modules 200 that provides for one storage module 200 to directly access data stored upon one or more storage devices 225 of storage module 200B by bypassing the processor 201 and/or operating system 250 of storage module 200B.

The remote node interface unit 214 provides an interface to one or more other storage modules (e.g. storage module 200C) that are connected to storage module 200 by a network 230 connection. Network 230 is a communication network or a storage network (e.g. network 130) and provides a communication connection between multiple storage modules 200 so that storage module 200 is able to forward a received I/O request from computer 100 to storage module 200C. To satisfy the forwarded I/O request, the processor 201 of storage module 200C accesses the data within the one or more storage devices 225 within storage module 200C or the processor 201 of storage module 200C directly accesses the data within another storage module 200 connected to storage module 200C by a peripheral connection 240 and the processor 201 of storage module 200C returns the data to computer 100.

Although the memory bus 203 is shown in FIG. 2 as a relatively simple, single bus structure providing a direct communication path among the processors 201, the main memory 202, and the I/O bus interface 205, in fact the memory bus 203 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 205 and the I/O bus 204 are shown as single respective units, the storage module 200 may, in fact, contain multiple I/O bus interface units 205 and/or multiple I/O buses 204.

Though shown as distinct entities, the multiple interface units 210, 212, 213, and 214 or the functionality of these units may be integrated into the unit.

Proxy manager 262 is program instructions that are stored upon memory 202 that when called by processor 201, in tandem with operating system 250, of a module 200, cause the processor 201 to receive a I/O read request from computer 100 via host interface 210 or receive a forwarded I/O read request from another module 202B, 202C via local node interface 213 or remote node interface 214, respectively.

Proxy manager 262 further causes the processor 201 to determine the logical address and physical address of data associated with the I/O read request or associated with the forward I/O read request. Proxy manager 262 further causes the processor 201 to service the forward I/O read request, determine whether module 200 should service the received I/O read request, or forward the received I/O read request to another module 200B, 200C.

Proxy manager 262 further causes the processor 201 of module 200 to identify which other storage module 200B, 200C within mega cluster 310 has direct access to the data associated with the I/O read request, if it is determined that, storage module 200 should forward the received I/O read request to another module 200B, 200C.

Proxy manager 262 may further manage data transport protocols within module 200 in order to receive data at module 200, move data within module 200, and/or send data from module 200. For example, proxy manager may handle transport protocol layers (iSCSI/FC, or the like) so that module 200 may send/receive data via network 130 and may handle the SCSI layer within module 200 so that module may send/receive data via local node interface 213 or remote node interface 214, store data to one or more storage devices 225, and/or handle or move data within storage module 200.

Interface manager 264 is program instructions that are stored upon memory 202 that when called by processor 201, in tandem with operating system 250, of a module 200, cause the processor 201 to manage I/O operations within module 200. For example, interface manager 264 may manage the satisfaction of a read request (i.e. identify and access the appropriate data and send the accessed data to the requesting device). More specifically, interface manager 264 may instruct transaction manager 266 to write data associated with a computer 100 I/O write request to a physical address of a storage device 225 within a module 200 in mega cluster 310. Similarly, interface manager 264 may instructs transaction manager 266 to read data associated with a computer 100 I/O read request from a physical address of a storage device 225 within a module 200 in mega cluster 310.

Transaction manager 266, is data read/write hardware and associated program instructions that write data to and read data from a storage device 255 within module 200. Transaction manager 266 may further cause the processor 201 of module 200 to implement data protection measures such as data distribution, RAID, replication, or the like, within module 200 and/or may maintain data integrity within module 200.

Distribution data structure manager 268 is program instructions that are stored upon memory 202 that when called by processor 201, in tandem with operating system 250, of a module 200, cause the processor 201 to populate a local distribution data structure (e.g. distribution data structure 400 shown in FIG. 4) within module 200, update the local distribution data structure as is applicable within module 200, and to replicate the local distribution data structure that is within module 200 to other storage modules 200B, 200C or to reconcile another distribution data structure that is within another storage module with the local distribution data structure such that respective local copies of the distribution data structure within each storage module 200 of the mega cluster have the same contents. For example, distribution data structure manager 268 of each storage module 200 may push or pull data structure content changes so that if a field is populated or changed in one distribution data structure by distribution data structure manager 268 a corresponding field is also populated or changed in all other distribution data structures.

For clarity, though shown as being stored or within memory 202, the respective program instruction of proxy manager 262, interface manager 264, transaction manager 266, distribution data structure manager 268 may be stored in one or more storage devices 225. For example, the portion of the program instructions of transaction manager 266 that write data to or read data from storage device(s) 225 may be stored within respective storage device(s) 225.

Similarly, though shown as distinct entities, the respective program instructions, or a portion thereof, of proxy manager 262, interface manager 264, transaction manager 266, distribution data structure manager 268 may be contained in the same entity.

Figure 3:
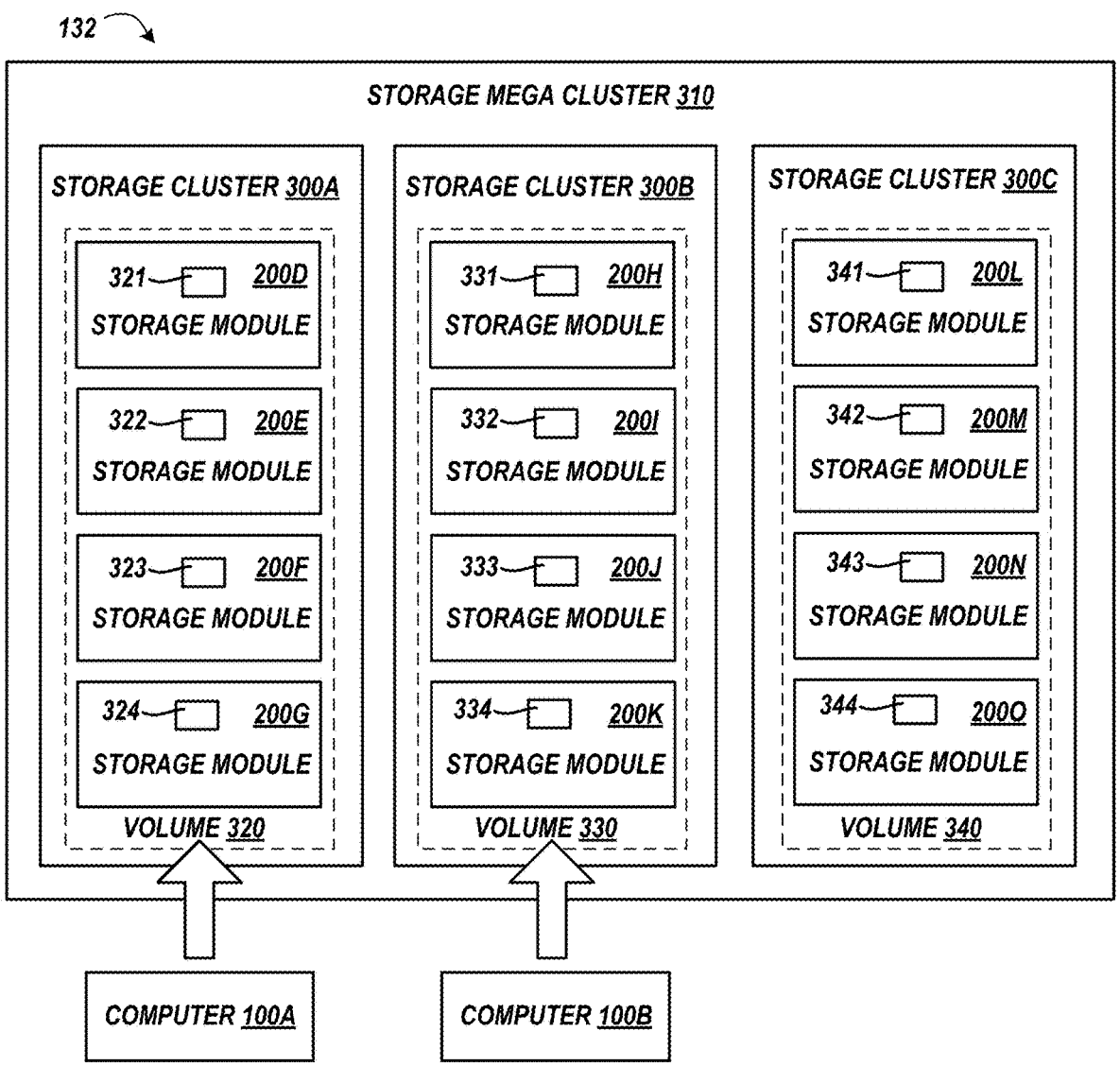
FIG. 3 illustrates a high-level block diagram of a multiple storage modules within a storage cluster and multiple storage clusters in a mega cluster, according to various embodiments of the invention.

FIG. 3 depicts multiple storage modules 200D-200G within storage cluster 300A, multiple storage modules 200G-200K within storage cluster 300B, and multiple storage modules 200L-200O within storage cluster 300C and depicts storage cluster 300A, storage cluster 300B, and storage cluster 300C within mega cluster 310. Mega cluster 310 is an exemplary storage system 132.

A storage cluster 300 is a single storage module 200 or two or more storage modules 200 that are connected to each other storage module 200 within the cluster 300 by peripheral connection 240. For example, storage module 200D is connected to storage module 200E, 200F, and 200G by distinct peripheral connections 240, storage module 200E is connected to storage module 200D, 200F, and 200G by distinct peripheral connections 240, storage module 200F is connected to storage module 200E, 200E, and 200G by distinct peripheral connections 240, and storage module 200G is connected to storage module 200D, 200E, and 200F by distinct peripheral connections 240.

Each cluster 300 is associated with a volume that is a cumulative storage area of each shared storage area that is directly accessible to other storage modules 200 within the cluster 300. For example, cluster 300A is associated with volume 320, cluster 300B is associated with volume 330, and cluster 300C is associated with volume 340.

Volume 320 is a cumulative storage area of each shared storage area 321, 322, 323, and 324. Shared storage area 321 is a logical portion of the one or more storage devices 225 of storage module 200D that is both accessible by the processor 201 and operating system 250 of storage module 200D and is directly accessible by the processor 201 and operating system 250 of each storage module 200E, 200F, and 200G by such by the processor 201 and operating system 250 circumventing the processor 201 and operating system 250 of storage module 200D.

Similarly, shared storage area 322 is a logical portion of the one or more storage devices 225 of storage module 200E that is both accessible by the processor 201 and operating system 250 of storage module 200E and is directly accessible by the processor 201 and operating system 250 of each storage module 200D, 200F, and 200G by such processor 201 and operating system 250 circumventing the processor 201 and operating system 250 of storage module 200E.

Similarly, shared storage area 323 is a logical portion of the one or more storage devices 225 of storage module 200F that is both accessible by the processor 201 and operating system 250 of storage module 200F and is directly accessible by the processor 201 and operating system 250 of each storage module 200D, 200E, and 200G by such processor 201 and operating system 250 circumventing the processor 201 and operating system 250 of storage module 200F.

Similarly, shared storage area 324 is a logical portion of the one or more storage devices 225 of storage module 200G that is both accessible by the processor 201 and operating system 250 of storage module 200G and is directly accessible by the processor 201 and operating system 250 of each storage module 200D, 200E, and 200F by such processor 201 and operating system 250 circumventing the processor 201 and operating system 250 of storage module 200G.

Volume 330 is a cumulative storage area of each shared storage area 331, 332, 333, and 334 that are directly accessible to other storage modules 200 within the cluster 300B. Shared storage area 331 is a logical portion of the one or more storage devices 225 of storage module 200H that is both accessible by the processor 201 and operating system 250 of storage module 200H and is directly accessible by the processor 201 and operating system 250 of each storage module 200I, 200J, and 200K by such by the processor 201 and operating system 250 circumventing the processor 201 and operating system 250 of storage module 200H.

Similarly, shared storage area 332 is a logical portion of the one or more storage devices 225 of storage module 200I that is both accessible by the processor 201 and operating system 250 of storage module 200I and is directly accessible by the processor 201 and operating system 250 of each storage module 200H, 200J, and 200K by such processor 201 and operating system 250 circumventing the processor 201 and operating system 250 of storage module 200I.

Similarly, shared storage area 333 is a logical portion of the one or more storage devices 225 of storage module 200J that is both accessible by the processor 201 and operating system 250 of storage module 200J and is directly accessible by the processor 201 and operating system 250 of each storage module 200H, 200I, and 200K by such processor 201 and operating system 250 circumventing the processor 201 and operating system 250 of storage module 200J.

Similarly, shared storage area 334 is a logical portion of the one or more storage devices 225 of storage module 200K that is both accessible by the processor 201 and operating system 250 of storage module 200K and is directly accessible by the processor 201 and operating system 250 of each storage module 200H, 200I, and 200J by such processor 201 and operating system 250 circumventing the processor 201 and operating system 250 of storage module 200K.

Volume 340 is a cumulative storage area of each shared storage area 341, 342, 343, and 344 that are directly accessible to other storage modules 200 within the cluster 300C. Shared storage area 341 is a logical portion of the one or more storage devices 225 of storage module 200L that is both accessible by the processor 201 and operating system 250 of storage module 200L and is directly accessible by the processor 201 and operating system 250 of each storage module 200M, 200N, and 200O by such by the processor 201 and operating system 250 circumventing the processor 201 and operating system 250 of storage module 200L.

Similarly, shared storage area 342 is a logical portion of the one or more storage devices 225 of storage module 200M that is both accessible by the processor 201 and operating system 250 of storage module 200M and is directly accessible by the processor 201 and operating system 250 of each storage module 200L, 200N, and 200O by such processor 201 and operating system 250 circumventing the processor 201 and operating system 250 of storage module 200M.

Similarly, shared storage area 343 is a logical portion of the one or more storage devices 225 of storage module 200N that is both accessible by the processor 201 and operating system 250 of storage module 200N and is directly accessible by the processor 201 and operating system 250 of each storage module 200L, 200N, and 200O by such processor 201 and operating system 250 circumventing the processor 201 and operating system 250 of storage module 200N.

Similarly, shared storage area 344 is a logical portion of the one or more storage devices 225 of storage module 200O that is both accessible by the processor 201 and operating system 250 of storage module 200O and is directly accessible by the processor 201 and operating system 250 of each storage module 200L, 200M, and 200N by such processor 201 and operating system 250 circumventing the processor 201 and operating system 250 of storage module 200O.

A computer 100A and computer 100B are communicatively connected to mega cluster 310 such that computer 100A and computer 100B may store data to cluster 310 and read data from cluster 310 as if that data was written to or read from one or more storage devices 125 within computer 100A, 100B, respectively. Each computer 100 that is communicatively connected is associated with a unique volume 320, 330, or 340. There are various techniques of associating, mapping, assigning, or the like, a computer 100 to unique volume within a storage system. For example, volume 320 may be assigned to computer 100A upon computer 100A first writing data to a storage module 200 within cluster 300A, volume 320 may be assigned to computer 100A by a cluster 310 manager prior to computer 100A first writing data to a storage module 200 within cluster 300A, etc. As is exemplarily depicted, computer 100A is associated with only volume 320 and computer 100B is associated with only volume 330. For clarity, though only one computer 100 is shown as being associated with a particular volume, many different computers 100 may be associated to the same volume.

FIG. 4 illustrates an exemplary partial distribution data structure 400 that identifies which data is accessible by each storage module 200 within mega cluster 310. Generally, distribution data structure 400 describes how the data within cluster 310 is distributed across the modules 200 within the cluster 310. Though shown as a tabular data structure, data structure 400 may take the form of other known data structure types. Further, though entries within data structure 400 are shown as human readable characters, entries within data structure 400 may also be computer readable characters.

Data structure 450 may include a logical address field 450, a volume ID field 452, a cluster ID field 454, a shared storage volume (SSV) ID field 458, and/or a physical address field 460. Logical address field 450 identifies the logical address of the data associated with the I/O access request by computer 100. Volume ID field 452 identifies the volume associated with the cluster 300 to which the data associated with the logical address was stored. Cluster ID field 454 identifies the cluster 300 to which the data associated with the logical address was stored. Module ID field 456 identifies the module 200 to which the data associated with the logical address was stored. SSV ID field 458 identifies the shared storage volume within the associated module 200 to which the data associated with the logical address was stored. Physical address field 460 identifies the physical address upon a storage device 225 that provided the shared storage area to which the data associated with the logical address was stored. The data structure 400 may contain fewer or greater number of entries. For example, data structure 400 may also include a storage device 225 ID field which identifies the particular storage device 225 that stored the associated data.

Data structure 400 is populated upon each writing of data from any computer 100 to cluster 310. Upon the writing of data associated with logical address "aaa" from computer 100A to volume 320, cluster 300A, module 200D, shared storage volume 321, at a physical address "zzz" of a storage device 225 within module 200D, such information is populated into data structure 400 in the appropriate fields. Likewise, upon the writing of data associated with logical address "aab" from computer 100A to volume 320, cluster 300A, module 200D, shared volume 321, at a physical address "zzy" of a storage device 225 within module 200D, such information is populated into data structure 400 in the appropriate fields. Likewise, upon the writing of data associated with logical address "aac" from computer 100A to volume 320, cluster 300A, module 200E, shared volume 322, at a physical address "zzz" of a storage device 225 within module 200E, such information is populated into data structure 400 in the appropriate fields. Likewise, upon the writing of data associated with logical address "aad" from computer 100A to volume 320, cluster 300A, module 200E, shared volume 322, at a physical address "zzy" of a storage device 225 within module 200E, such information is populated into data structure 400 in the appropriate fields. Likewise, upon the writing of data associated with logical address "aae" from computer 100A to volume 320, cluster 300A, module 200F, shared volume 323, at a physical address "zzz" of a storage device 225 within module 200F, such information is populated into data structure 400 in the appropriate fields. Likewise, upon the writing of data associated with logical address "aaf" from computer 100A to volume 320, cluster 300A, module 200F, shared volume 323, at a physical address "zzy" of a storage device 225 within module 200F, such information is populated into data structure 400 in the appropriate fields. Likewise, upon the writing of data associated with logical address "aag" from computer 100A to volume 320, cluster 300A, module 200F, shared volume 323, at a physical address "zzx" of a storage device 225 within module 200F, such information is populated into data structure 400 in the appropriate fields. Likewise, upon the writing of data associated with logical address "aah" from computer 100A to volume 320, cluster 300A, module 200G, shared volume 324, at a physical address "zzz" of a storage device 225 within module 200G, such information is populated into data structure 400 in the appropriate fields.

Similar techniques may be utilized to populate data structure 400 upon each writing of data from, for example, computer 100B to various physical addresses within associated shared storage volumes of various storage devices 225 of various modules 200 within volume 320 and cluster 300B.

In the exemplary data structure 400 depicted each field in the same row is associated. More generally the information identified by fields 450, 452, 454, 456, 458, and/or 460 that coarsely or granularly identify where a particular data is stored within mega cluster 310 is herein contemplated as being associated.

Figure 5:
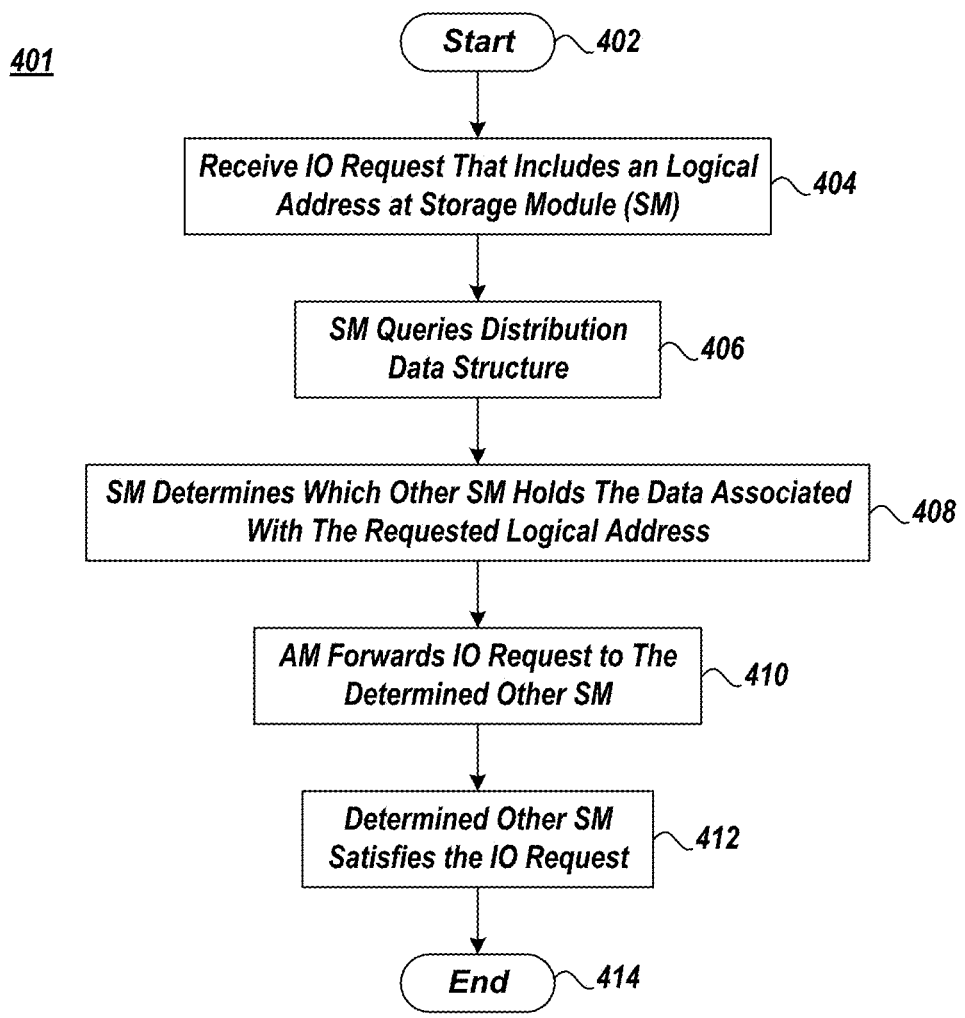
FIG. 5 illustrates an exemplary method of satisfying an I/O request by a mega cluster, according to various embodiments of the present invention.

FIG. 5 illustrates an exemplary method 401 of satisfying an I/O read request by mega cluster 210. Method 401 may be utilized by a node 200 within mega cluster 210 that receives an I/O read request from computer 100 to determine whether the node 200 should satisfy the I/O read request or whether the I/O read request should be forwarded to another node 200 within cluster 310. Method 401 begins at block 402 and continues with a storage module 200 receiving an I/O read request from computer 100 (block 404). The I/O read request from computer 100 includes a logical address that is associated with requested data and may also be associated with a particular volume 320, 330, or 340 assigned to the computer 100 that which originated the I/O read request. In an embodiment, the proxy manager 262 receives the I/O read request via host interface 210 and storage network 130 from computer 100.

Method 401 may continue with the storage module 200 querying a distribution data structure (block 406). For example, storage module 200 utilizes the logical address as a query input against the distribution data structure to determine a physical address(es) of one or more storage devices 225 that which the data associated with the I/O read request is stored. In an embodiment, distribution data structure manager 268 queries the local distribution data structure 400 to determine the volume (e.g. volume 320, 330, or 340) to which the data associated with the I/O read request is stored, to determine the cluster (e.g. volume 300A, 300B, or 300C) to which the data associated with the I/O read request is stored, to determine which storage module (e.g. 200D-200O) to which the data associated with the I/O read request is stored, to determine which shared storage volume (331-324, 331-334, or 341-344) to which the data associated with the I/O read request is stored, and/or to which physical address(es) (zzz, zzy, or zzx) of one or more storage devices 225 within modules 220D-220O that which the data associated with the I/O read request is stored.

Method 401 may continue with storage module 200 determining which module holds the data associated with the I/O read request is stored (block 408). In one possibility, the storage module 200 itself may determine that it holds the data associated with the I/O read request. In other words, the data associated with the I/O read request is stored upon a storage device 225 within storage module 200. In an embodiment, the storage module 200 satisfies the I/O read request (block 412) by accessing the data associated with the I/O read request that is stored upon storage device 225 within storage module 200 and returning the accessed data to computer 100. For example, interface manager 264 and transaction manager 266 access the data associated with the I/O read request stored upon storage device 225 via storage interface 212 and sends the accessed data to computer 100 via host interface 210 and network 130.

In another possibility, the storage module 200 may determine that another storage module within a shared cluster 300 holds the data associated with the I/O read request. In other words, the data associated with the I/O read request is stored upon a storage device 225 within a different storage module that is in the same cluster 300 as storage module 200. In one embodiment, because storage module 200 has direct access to the data stored within other storage modules within the same cluster 300, storage module 200 may accesses that data and satisfy the I/O read request. For example, interface manager 264 and transaction manager 266 access the data associated with the I/O read request stored upon storage device 225 of the other storage module via local node interface 213 and peripheral connection 240 and sends the accessed data to computer 100 via host interface 210 and network 130. In another embodiment, storage module 200 may forward the I/O read request to the other storage module within the same cluster 300 (block 410). In this embodiment, proxy manager 262 of storage module 200 may forward the I/O read request to the proxy manager 262 of the other storage module via local node interface 213 and peripheral connection 240. In this embodiment, the proxy manager 262 may determine which interface manager 264 is co-located with the transaction manager 266 that may write to or read from the physical address of the storage device 252 that is associated with the logical address of the I/O read request to determine the appropriate storage module 200 to forward the I/O read request.

In yet another possibility, the storage module 200 may determine that another storage module within a different cluster 300 holds the data associated with the I/O read request. In other words, the data associated with the I/O read request is stored upon a storage device 225 within a different storage module that is in a different cluster 300 as storage module 200. In an embodiment, storage module 200 may forward the I/O read request to the other storage module within the different cluster 300 (block 410). In this embodiment, proxy manager 262 of storage module 200 may forward the I/O read request to the proxy manager 262 of the other storage module via remote node interface 214 and network 230. In this embodiment, the proxy manager 262 may determine which interface manager 264 is co-located with the transaction manager 266 that may write to or read from the physical address of the storage device 252 that is associated with the logical address of the I/O read request to determine the appropriate storage module 200 to forward the I/O read request.

Method 401 may continue with the determined storage module satisfying the I/O read request (block 412). For example, the interface manager 262 along with the appropriate transaction manager 264 access the data at the associated physical address of the storage device 225 via the appropriate storage interface 212, local node interface 213, or remote node interface 214 and return the data to the computer 100 via host interface 210 of the determined storage module 200.

Figure 6:
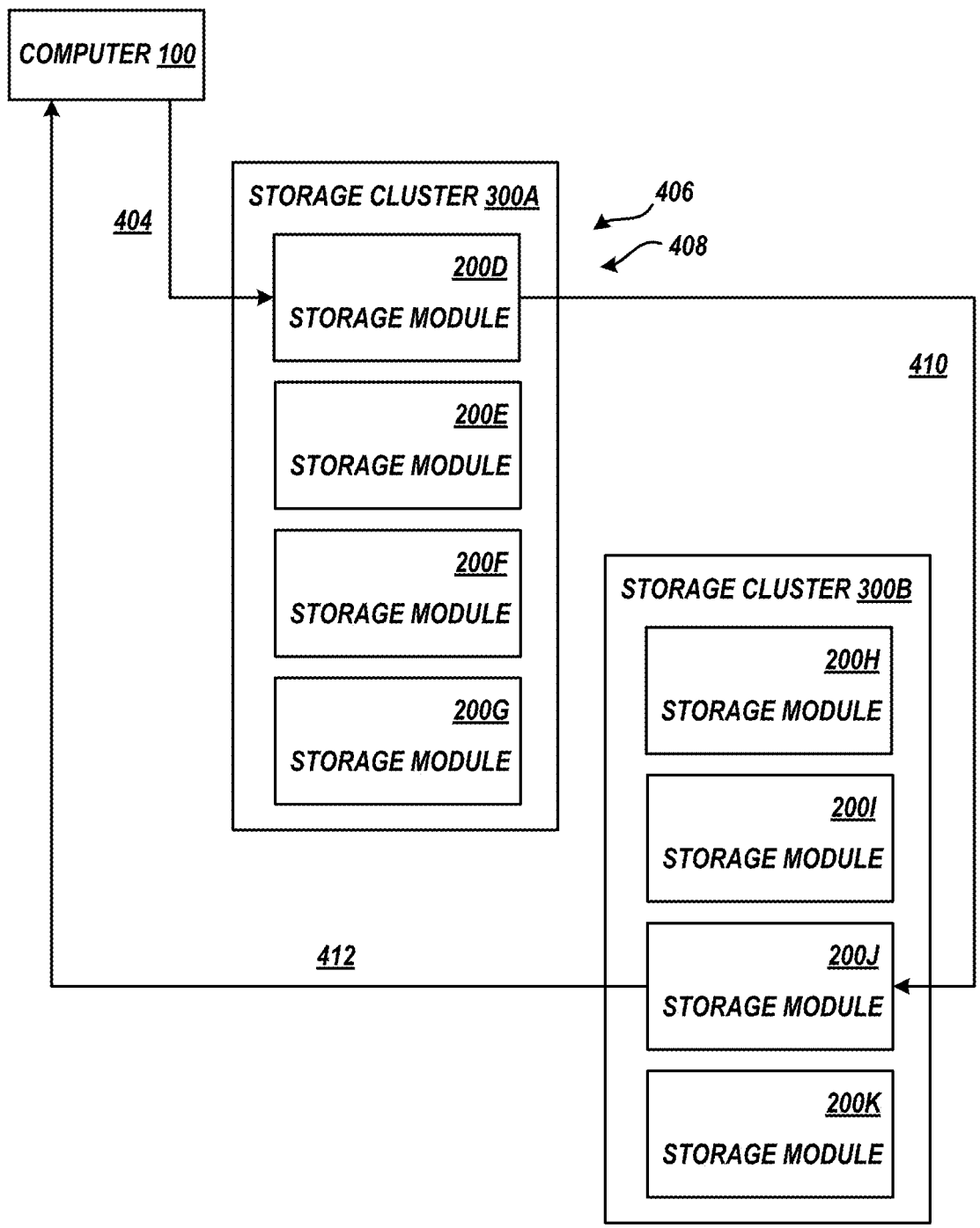
FIG. 6 illustrates an exemplary implementation of satisfying an I/O request utilizing storage modules that are located in different clusters, according to various embodiments of the present invention.

FIG. 6 illustrates an exemplary implementation of satisfying an I/O read request from computer 100 utilizing storage module 200D located in cluster 300A and storage module 200J located in cluster 300B. In this implementation, storage module 200D receives an I/O read request from computer 100 (corresponding to block 404 of FIG. 5). Storage module 200D receives such request at proxy manager 262 of module 200D via host interface 210 of module 200D. The received I/O read request is requesting data associated with logical address "bae." The received host I/O read request may also include an associated assigned volume identifier (i.e., volume 330) associated with the particular computer 100.

Storage module 200D queries data structure 400 (corresponding to block 406 of FIG. 5). For example, proxy manager 262 submits a query with a query input of logical address "bae" against data structure 400. In another example, proxy manager 262 may submit a two part query against the data structure 400 with a first input of the volume identifier (i.e. volume 320, volume 330, or volume 340) that is associated with the computer 100 that is making the I/O read request to effectively shrink the data structure 400 to only those entries that are associated with the particular volume 320, volume 330, or volume 340. In the depicted example, therefore, proxy manager 262 of module 200D may submit a first query input of volume 330 against data structure 400 to effectively shrink data structure 400 to only those entries that list volume 330 in field 452 and subsequently submit a second query input of logical address "bae" against data structure 400.

Such query or queries determine that the data associated with logical address "bae" is stored at a physical address "zzz" within shared storage volume 333 of a particular storage device 225 within module 200J (corresponding to block 408 of FIG. 5). Subsequent to the determination that module 200J is the module in which transaction manager 264 is able to access the data at physical address "zzz" of the particular storage device 225, proxy manager 262 forwards the I/O request to proxy manager 262 of storage module 200J via remote node interface 214 and network 230 (corresponding to block 410 of FIG. 5). Proxy manager 262 of module 200J receives the forwarded I/O read request upon its proxy manager 262 via the remote node interface 214 of module 200J. The interface manager 264 along with transaction manager 266 of module 200J fetch the data at physical address "zzz" of the storage device 225 within module 200J and return the data to computer 100 via host interface 210 to computer 100 (corresponding to block 412 of FIG. 5).

Figure 7:
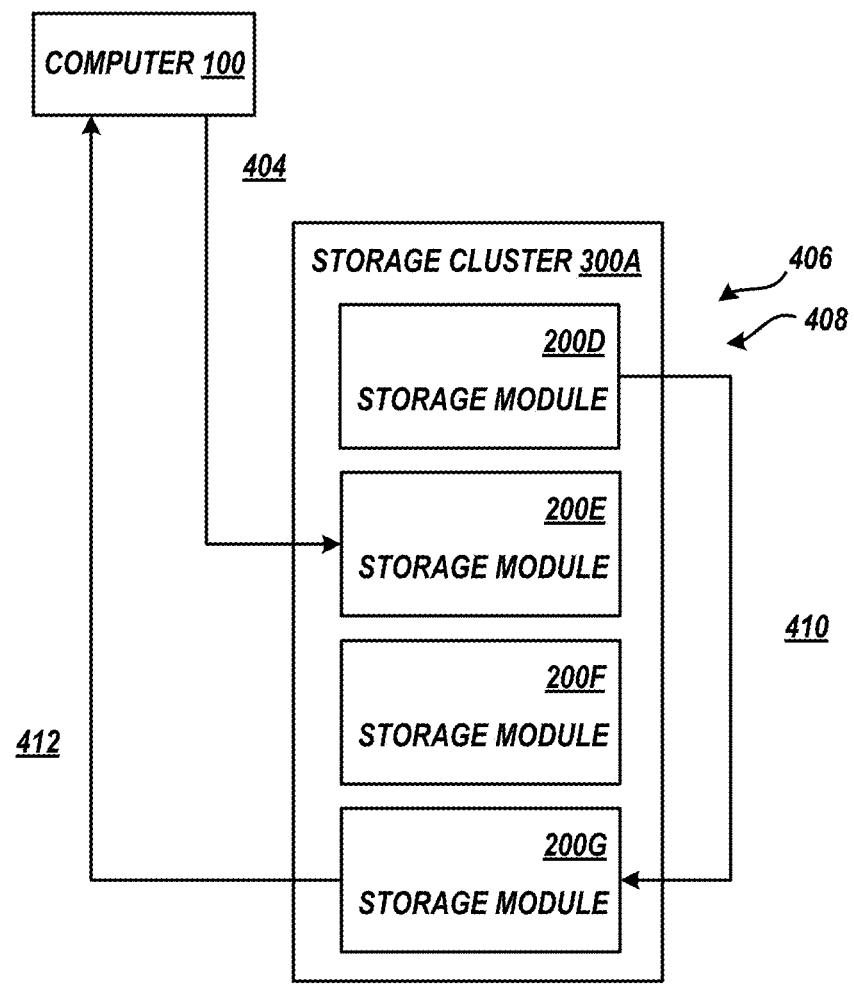
FIG. 7 illustrates an exemplary implementation of satisfying an I/O request utilizing storage modules that are located in the same cluster, according to various embodiments of the present invention.

FIG. 7 illustrates an exemplary implementation of satisfying an I/O request utilizing storage module 200E and 200G that are located in the same cluster 300A. In this implementation, storage module 200E receives an I/O read request from computer 100 (corresponding to block 404 of FIG. 5). Storage module 200E receives such request at proxy manager 262 of module 200E via host interface 210 of module 200E. The received I/O read request is requesting data associated with logical address "aah." The received I/O read request may also include an associated assigned volume identifier associated with the particular computer 100 (i.e., volume 320).

Storage module 200E queries data structure 400 (corresponding to block 406 of FIG. 5). For example, proxy manager 262 of module 200E submits a query with a query input of logical address "aah" against data structure 400. In another example, proxy manager 262 of module 200E may submit a two part query against the data structure 400 with a first input of the volume identifier (i.e. volume 320, volume 330, or volume 340) that is associated with the computer 100 that is making the I/O read request to effectively shrink the data structure 400 to only those entries that are associated with the particular volume 320, volume 330, or volume 340. In the depicted example, therefore, proxy manager 262 of module 200E may submit a first query input of volume 320 against data structure 400 to effectively shrink data structure 400 to only those entries that list volume 320 in field 452 and subsequently submit a second query input of logical address "aah" against data structure 400.

Such query or queries determine that the data associated with logical address "aah" is stored at a physical address "zzz" within shared storage volume 334 of a particular storage device 225 within module 200G (corresponding to block 408 of FIG. 5). Subsequent to the determination that module 200G is the module in which transaction manager 264 is able to access the data at physical address "zzz" of the particular storage device 225, proxy manager 262 of module 200D forwards the I/O request to proxy manager 262 of storage module 200G via remote node interface 214 of module 200D and network 230 (corresponding to block 410 of FIG. 5). Proxy manager 262 of module 200G receives the forwarded I/O read request via the remote node interface 214 of module 200G. The interface manager 264 of module 200G along with transaction manager 266 of module 200G fetch the data at physical address "zzz" of the storage device 225 within module 200G and return the data to computer 100 via host interface 210 to computer 100 (corresponding to block 412 of FIG. 5).

Figure 8:
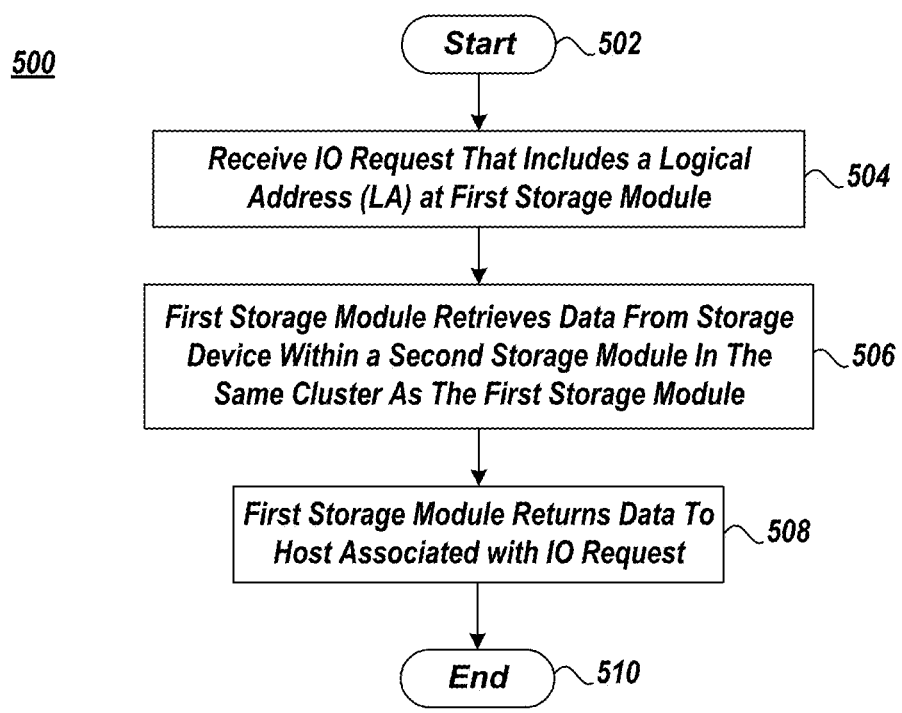
FIG. 8 illustrates an exemplary method of satisfying an I/O request by a mega cluster, according to various embodiments of the present invention.

FIG. 8 illustrates an exemplary method 500 of satisfying an I/O request by mega cluster 310. Method 500 may be utilized by a module 200 within mega cluster 310 that receives an I/O read request from computer 100 or a forwarded I/O request from a different module 200 to satisfy the I/O read request or satisfy the forwarded I/O read request by directly accessing data within a different storage module within the same cluster 300.

Method 500 begins at block 402 and continues with a first storage module 200 receiving an I/O read request from computer 100 or receiving a forwarded I/O read request from a different storage module that is within a different cluster 300 relative to storage module 200 (block 504). The I/O read request from computer 100 or the forwarded I/O read request includes a logical address that is associated with requested data and may also be associated with a particular volume 320, 330, or 340 assigned to the computer 100 that which originated the I/O read request. In an embodiment, the proxy manager 262 of the first storage module 200 receives the I/O read request from computer 100 via host interface 210 and storage network 130 or receives the forwarded I/O read request from the other module via remote node interface 213 and network 230.

Method 500 may continue with the first storage module 200 directly accessing data from a storage device 225 that is associated with the logical address of the I/O read request within a second storage module 200 that is located in the same cluster 300 as the first storage module 200 (block 506).

The first storage module 200 may querying distribution data structure 400 to determine the data and particular storage device 225 associated with the logical address. For example, the first storage module 200 utilizes the logical address as a query input against the distribution data structure 400 to determine a physical address of storage devices 225 that which the data associated with the I/O read request is stored. The first storage module 200 determines the storage module 200 that holds the data associated with the I/O read request is within the same cluster 300. In other words, the data associated with the I/O read request is stored upon a storage device 225 within the second storage module that is in the same cluster 300 as the first storage module 200.

Because the first storage module 200 has direct access to the data stored within other storage modules within the same cluster 300, storage module 200 accesses that data within the second storage module 200 and satisfies the I/O read request (block 508). For example, interface manager 264 of the first module 200 and the portion of the transaction manager 266 within the storage device 225 that holds the data associated with the I/O read request access the data bypassing the processor 201 and operating system 250 of the second storage module 200 and sends the accessed data to the computer 100 that originated the I/O read request via host interface 210 of the first storage module 200 and network 130. Method 500 ends at block 510.

Figure 9:
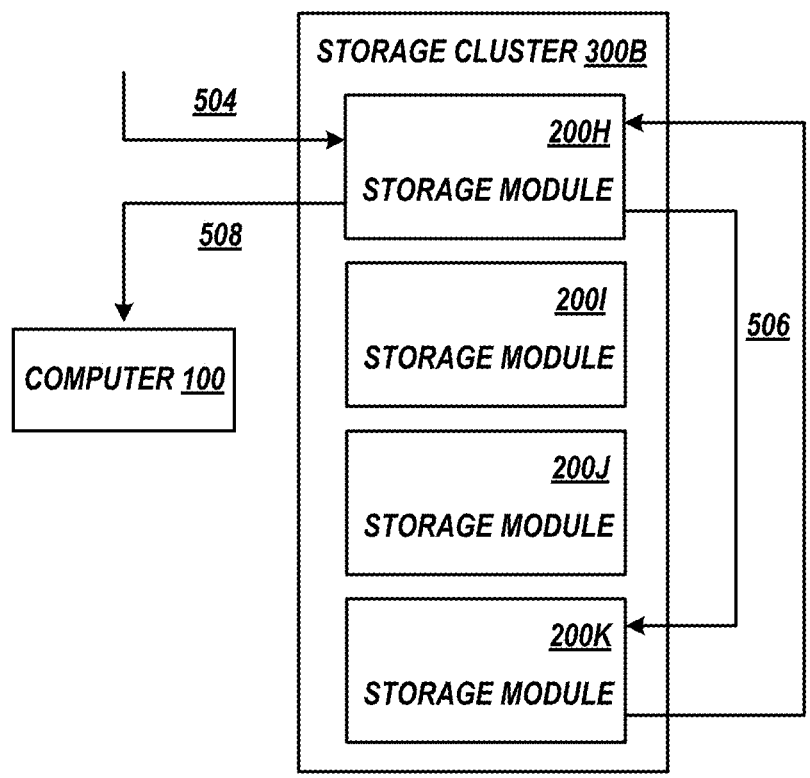
FIG. 9 illustrates an exemplary implementation of satisfying an I/O request utilizing storage modules that are located in the same cluster, according to various embodiments of the present invention.

FIG. 9 illustrates an exemplary technique of satisfying an I/O request by storage module 200H accessing data within storage module 200K, with module 200H and module 200K being located in the same cluster.

Storage module 200H receives an I/O read request from computer 100 or a forwarded I/O request from a different module 200 within cluster 300A or within 300C (corresponding with block 504 of FIG. 8). Rather than storage module 200K, that contains the data associated with the I/O read request, satisfying the I/O read request from computer 100 or the forwarded I/O request, in the present embodiment, storage module 200H satisfies the I/O read request from computer 100 or the forwarded I/O request The I/O read request from computer 100 or the forwarded I/O read request includes logical addresses "baf", "bag", and "bah" that are associated with requested data and may also be associated with a particular volume 320, 330, or 340 assigned to the computer 100 that which originated the I/O read request. In an embodiment, the proxy manager 262 of the storage module 200H receives the I/O read request from computer 100 via host interface 210 and storage network 130 or receives the forwarded I/O read request from the other module 200 within cluster 300A or cluster 300C via remote node interface 213 and network 230.

The storage module 200H directly accesses the data from one or more storage devices 225 that are associated with the logical address "baf", "bag", and "bah" of the I/O read request that are located within storage module 200K (corresponding to block 506 of FIG. 8). Storage module 200H may query distribution data structure 400 to determine the physical address of the data and particular storage device 225 associated with the logical address. For example, storage module 200H utilizes the logical address "baf", "bag", and "bah" as respective query input against the distribution data structure 400 to determine physical address "zzz", "zzy", and "zzx" of particular one or more storage devices 225 within module 200K that which the data associated with the I/O read request are stored.

Because storage module 200H is able to directly access to the data stored within other storage modules within the same cluster 300B, storage module 200H accesses that data within storage module 200J at respective physical address "zzz", "zzy", and "zzx" of the particular storage device(s) 225 within module 200J and satisfies the I/O read request (corresponding to block 508 of FIG. 8). For example, interface manager 264 of the module 200H and the portion of the transaction manager 266 within the storage device(s) 225 within module 200K that hold the data at respective physical addresses "zzz", "zzy", and "zzx" access the data bypassing the processor 201 and operating system 250 of storage module 200K and sends the accessed data to the computer 100 that originated the I/O read request via host interface 210 of storage module 200H and network 130.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A layered clustered scale-out storage system comprising:
   a first cluster comprising a plurality of storage modules;
   a second cluster comprising a plurality of storage modules;
   a first storage module, within the first cluster, comprising a processor that is configured to:
      receive an I/O read request and a logical address associated with requested data of the I/O read request from a requesting host computer;
      determine that the requested data is not located within any of a plurality of storage modules also within the first cluster;
      determine that the requested data is located within the second cluster;
   a second storage module, within the second cluster, comprising a processor that is configured to:
      receive the I/O read request from the processor of the first storage module;
      determine that the requested data is stored within a third storage module also within the second cluster;
   a third storage module, within the second cluster, comprising a processor that is configured to:
      receive the I/O read request from the processor of the second storage module;
      access the requested data; and
      returns the requested data to the requesting host computer.

2. The system of claim 1, wherein the processor of the second storage module is further configured to:
   query a distribution data structure stored within each of the plurality of storage modules utilizing the logical address as a query input;
   determine from the distribution data structure query which storage device within the third storage module stores the requested data; and
   determine from the distribution data structure query a physical address of the storage device within the third storage module where the requested data is stored.

3. The system of claim 1, wherein the second storage module is connected to the third storage module by a local node interface.

4. The system of claim 1, wherein the first storage module is connected to the second storage module by a remote node interface.

5. The system of claim 1, wherein the first storage module comprises a host interface that is communicatively connected to the host computer.

6. The system of claim 1, wherein the first storage module comprises a remote node interface and wherein the processor of the first storage module sends the I/O read request to the second storage module across the remote node interface.

7. The system of claim 1, wherein the second storage module is connected to the third storage module by a peripheral connection.

8. The system of claim 1, wherein the first storage module is connected to the second storage module by a network connection.

9. The system of claim 2, wherein each of the plurality of storage modules are configured to:
   populate the distribution data structure, upon writing of data associated with an I/O write request thereto, with a logical address that is associated with the I/O write request, with a storage module identifier, with a storage device identifier, and with a physical address of the storage device; and
   allocate the distribution data structure to each of the other plurality of storage modules.

10. A layered clustered scale-out storage system comprising:
    a first cluster comprising a plurality of storage modules;
    a second cluster comprising a plurality of storage modules;
    a first storage module, within the first cluster, comprising a processor that is configured to:
       receives an I/O read request and a logical address associated with requested data of the I/O read request from a requesting host computer;
       determines that the requested data is not located within any of a plurality of storage modules also within the first cluster;
       determines that the requested data is located within the second cluster;
    a second storage module, within the second cluster, comprising a processor that is configured to:
       receives the I/O read request from the processor of the first storage module;
       determines that the requested data is stored within a third storage module also within the second cluster;
       directly accesses the requested data within the third storage module bypassing a processor and operating system of the third storage module; and
       returns the requested data to the requesting host computer.

11. The system of claim 10, wherein the processor of the first storage module is further configured to determine that the second cluster is assigned to the requesting host computer.

12. The system of claim 10, wherein the processor of the second storage module is further configured to:
    query a distribution data structure stored within the second storage module which to determine which storage device within the third storage module stores the requested data; and
    query the distribution data structure to determine a physical address where the requested data is stored in the storage device within the third storage module.

13. The system of claim 10, wherein the second storage module is connected to the third storage module by a local node interface.

14. The system of claim 10, wherein the first storage module is connected to the second storage module by a remote node interface.

15. The system of claim 12, wherein each of the plurality of storage modules are configured to:
    populate the distribution data structure, upon writing of data associated with an I/O write request thereto, with a logical address that is associated with the I/O write request, with a storage module identifier, with a storage device identifier, and with a physical address of the storage device; and
    allocate the distribution data structure to each of the other plurality of storage modules.

16. A computer program product for satisfying an input output (I/O) read request with a layered clustered scale-out storage system, the computer program product comprising computer readable storage mediums having program instructions embodied therewith, the program instructions are readable to cause:
    a processor of a first storage module to receive an I/O read request and a logical address associated with requested data of the I/O read request from a requesting host computer;

the processor of the first storage module to determine that the requested data is not located within any of a plurality of storage modules within a same first cluster as that of the first storage module;

the processor of the first storage module to determine that the requested data is located within a second cluster that comprises a plurality of storage modules;

the processor of the first storage module to forward the I/O read request to a second storage module that is comprised within the second cluster;

the processor of the second storage module to determine that the requested data is stored within a third storage module that is comprised the second cluster;

the processor of the second storage module to directly access the requested data within the third storage module bypassing a processor and operating system of the third storage module; and the processor of the second storage module to return the requested data to the requesting host computer.

17. The computer program product of claim 16, wherein program instructions are readable to cause:

the processor of the first storage module to determine that the second cluster is assigned to the requesting host computer.

18. The computer program product of claim 16, wherein program instructions are readable to cause:

the processor of the second storage module to query a distribution data structure stored within the second storage module to determine which storage device within the third storage module stores the requested data.

19. The computer program product of claim 16, wherein program instructions are readable to cause:

the processor of the second storage module to query a distribution data structure stored within the second storage module to determine which physical address that identifies a location within the third storage module where the requested data is stored.

20. The computer program product of claim 16, wherein program instructions are readable to cause:

each storage module within the layered clustered scale-out storage system to populate the distribution data structure, upon writing of data associated with an I/O write request thereto, with a logical address that is associated with the I/O write request, with a storage module identifier, with a storage device identifier, and with a physical address of the storage device; and each storage module within the layered clustered scale-out storage system to allocate the distribution data structure to each of the other plurality of storage modules.

\* \* \* \* \*